United States Patent [19] [11] 3,905,640
Lutz [45] Sept. 16, 1975

[54] LEVEL ADJUSTING DEVICE FOR SLIDING ROOFS
[75] Inventor: Alfons Lutz, Emmering, Germany
[73] Assignee: Webasto-Werk W. Baier KG, Stockdorf, Munich, Germany
[22] Filed: Mar. 8, 1974
[21] Appl. No.: 449,387

[30] Foreign Application Priority Data
Mar. 9, 1973 Germany............................ 2311624

[52] U.S. Cl. ................................. 296/137 F; 49/209
[51] Int. Cl................................................ B60j 7/04
[58] Field of Search.......... 296/137 E, 137 F, 137 H, 296/137 R, 137 B, 137 G; 52/66; 49/209, 255; 403/87

[56] References Cited
UNITED STATES PATENTS
2,316,436  4/1943  Kalter .................................. 403/87
2,968,514  1/1961  Golde .............................. 296/137 F
3,025,099  3/1962  Werner............................ 296/137 F
3,632,160  1/1972  Schlapp........................... 296/137 F FOREIGN PATENTS OR APPLICATIONS
856,560  12/1960  United Kingdom............. 296/137 G Primary Examiner—Robert J. Spar
Assistant Examiner—Gary Auton
Attorney, Agent, or Firm—Joseph A. Geiger

[57] ABSTRACT

A level adjusting device for rigid panel automobile sliding roof assemblies in which the lateral panel guide includes a pivotable guide shoe carrier and a guide shoe engaging a stationary guide profile, the guide shoe carrier being pivotable around a transverse axis and securable by means of serrated discs and a clamping nut.

10 Claims, 2 Drawing Figures

LEVEL ADJUSTING DEVICE FOR SLIDING ROOFS

BACKGROUND OF THE INVENTION

1. Field of the Invention

The present invention relates to automobile sliding roof mechanisms, and in particular to level adjusting devices for rigid sliding roof panels which are guided for longitudinal motion by means of lateral guide profiles and cooperating guide shoes.

2. Description of the Prior Art

A variety of level adjusting means of the above-mentioned type are already known from the prior art. The majority of these prior art solutions suggest a structure in which the guide shoes are carried by a bracket which is adjustably attached to the sliding rool panel by means of several positioning screws. Another suggestion concerns itself with an adjustable guide shoe carrier which, for purposes of adjustment, is connected to an eccentric which is rotatable around an axis extending in the direction of panel displacement. A common shortcoming of these prior art structures is the fact that they are comparatively complex in design and therefore rather expensive. Furthermore, their design dimensions are no longer acceptable under the present requirements of reduced overall height of the sliding roof assembly.

SUMMARY OF THE INVENTION

It is a primary objective of the present invention to provide an improved level adjusting device for sliding roof panels which is simple in operation, inexpensive to manufacture, and as compact as possible in its space requirements, as far as the overall height of the sliding roof structure is concerned.

In order to attain this objective, the present invention suggests a novel level adjusting device for rigid panel sliding roof assemblies of automobiles in which the panel is laterally guided on stationary guide profiles engaged by guide shoes attached to guide shoe carriers. The novel combination includes at least two guides show carriers which are arranged for pivotable adjustment around a horizontal axis extending transversely to the movement direction of the sliding roof panel.

A preferred embodiment of the invention suggests that the guide shoe itself is likewise rotatable in relation to the pivotable guide shoe carrier. Furthermore, the guide shoe carrier is advantageously at least in part made of rod material. A preferred guide shoe carrier consists of a U-shaped rod having a long upper leg defining its pivot axis and a short lower leg carrying the guide shoe.

The angular adjustability of the pivotable guide show carrier is preferably obtained by releasable clamping means. This can take the form of a threaded end portion on the upper leg of the U-shaped guide shoe carrier which engages a supporting bracket attached to the rool panel, the guide shoe carrier being clampable to said bracket by means of one or two nuts.

In the preferred embodiment of the invention the rotational clamping means of the guide show carrier are provided in the form of two cooperating serrated discs, one being solidary with the earlier-mentioned support bracket, the other being attached to the upper leg of the guide shoe carrier adjacent to the other serrated disc on the opposite side of the clamping nut.

This structure has the advantage of providing a rigid guide shoe carrier, free of any binding tendencies between the guide shoes and the lateral guide profiles. The manufacture of the guide shoe carriers from plain rod material constitutes a saving in production costs. Lastly, the use of simple serrated discs as a clamping means for the angular positioning of the guide shoe carrier makes it possible to accommodate the novel level adjusting device within a minimal heighth of the sliding roof structure.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows.

DESCRIPTION OF THE PREFERRED EMBODIMENT

Figure 1:
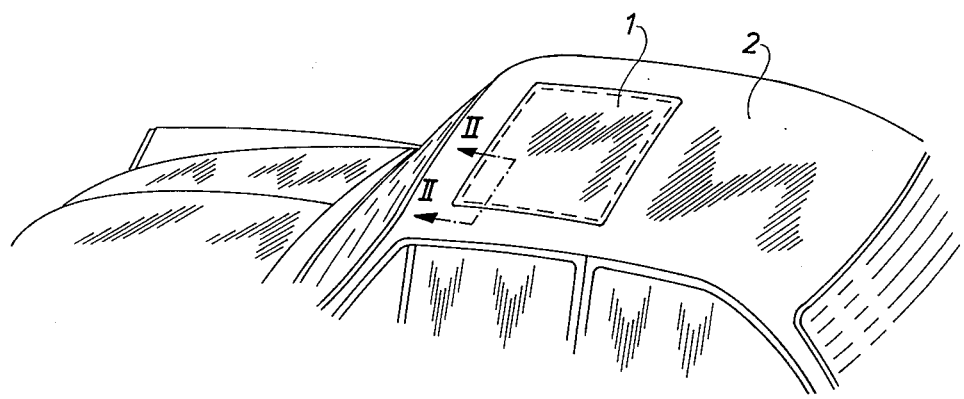
FIG. 1 shows in a perspective representation a sliding roof panel arranged in the roof structure of an automobile.

In FIG. 1 is shown an outside view of a rigid sliding roof panel 1 which is openable in the conventional manner by first lowering the rear portion of panel 1 and then retracting the panel underneath the stationary roof portion 2.

Figure 2:
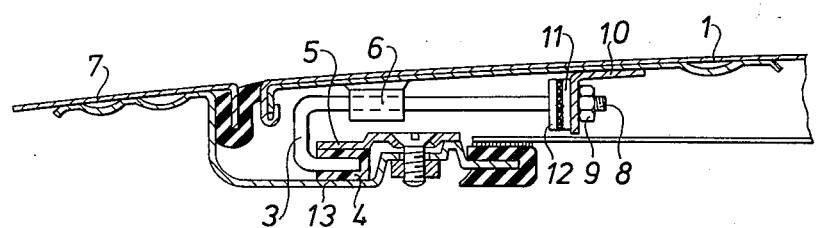
FIG. 2 represents an enlarged vertical cross section taken along line II—II of FIG. 1.

In FIG. 2 is illustrated how the rigid sliding rool panel 1 is laterally guided during its opening or closing motion. This is accomplished by means of a guide shoe carrier 3 with a guide shoe 4 engaging a stationary lateral guide profile 5. It should be understood that the same structure is also provided on the opposite side of the sliding roof.

In the embodiment shown the guide shoe carrier 3 consists of a simple U-shaped rod which is mounted to the sliding roof panel 1 by means of a pivot connection composed of a pivot block 6 and a support bracket 10, both of which are attached to the panel 1. For this purpose, the guide shoe carrier 3 has a longer upper leg engaging the aforementioned pivot connection and a shorter lower leg carrying the guide shoe 4. The guide shoe is preferably likewise pivotable with respect to the guide shoe carrier 3.

Level adjustment of the rigid sliding roof panel 1 relative to the adjacent stationary roof portion 7 and the rear stationary roof portion 2 is made possible through an angular repositioning of the guide shoe carrier 3 in its pivot connection 6, 10. Following such angular repositioning, the guide shoe carrier 3 is secured against the rigid panel 1 with the aid of releasable clamping means. In the embodiment of FIG. 2 this clamping means includes a threaded end portion 8 on the longer, upper leg of the guide shoe carrier 3 and a cooperating clamping nut 9 retaining the guide shoe carrier 3 against the support bracket 10, which has a vertical wall portion extending transversely to the upper leg and pivot axis of carrier 3.

In order to obtain a more positive clamping action on the guide shoe carrier, so as not to rely on friction alone, the clamping means may further include a pair of serrated positioning discs 11 and 12; disc 11 being attached to the vertical wall portion of support bracket 10, while the second disc 12 is solidary with the upper leg of the guide shoe carrier 3 and positioned adjacent the first disc, opposite the clamping nut 9. Thus, no accidental readjustment of the level is possible, as long as the two positioning discs 11 and 12 are held together by nut 9.

The engagement between the guide shoe 4 and the cooperating lateral guide profile 5 is preferably accomplished in a known manner by providing parallel upper and lower guide faces which are constituted by the rain channel 13 of the stationary roof portion on the one hand, and an opposing detachable guide flange on the other hand. It is, of course, also possible to avoid using the rain channel itself as a guide face, by providing a separate detachable profile which is interposed between the rain channel and the guide shoe 4.

It should be understood, of course, that the foregoing disclosure describes only a preferred embodiment of the invention and that it is intended to cover all changes and modifications of this example of the invention which fall within the scope of the appended claims.

I claim:

1. In a sliding roof assembly for atuomobiles in which a rigid sliding roof panel is displaceable from the roof opening through retraction under the rearwardly adjacent stationary roof structure along lateral guide means arranged underneath said panel, a device for adjusting the level of the sliding roof panel in relation to said guide means, the device comprising in combination:
   a lateral guide profile as part of said lateral panel guide means having opposing guide faces adapted to provide vertically determined guidance;
   a guide shoe having at least one guide face engaging said guide profile;
   a guide shoe carrier to which said guide shoe is connected;
   a pivot connection between said guide shoe carrier and the rigid sliding roof panel having its pivot axis fixed in relation to the roof panel and so oriented that an angular adjustment of the guide shoe carrier about said axis changes the vertical distance between said panel and the lateral guide profile, by vertically displacing the guide shoe relative to the level of the pivot connection; and
   means for releasably locking said pivot connection in any one of a plurality of angular adjustment positions.

2. A level adjusting device as defined in claim 1, wherein:
   said pivot connection is located vertically near the roof panel, its pivot axis being an upper pivot axis oriented substantially horizontally and transversely in relation to the lateral guide profile.

3. A level adjusting device as defined in claim 2, wherein: the guide shoe carrier is at least in part made of rod material.

4. A level adjusting device as defined in claim 2, wherein
   the connection between the guide shoe and the guide shoe carrier is constituted by a lower pivot connection having a lower pivot axis which is substantially parallel to said upper pivot axis.

5. A level adjusting device as defined in claim 4, wherein:
   the guide shoe carrier is essentially constituted by a shaped rod having the outline of a horizontally tilted "U", with an upper horizontal leg and a parallel lower horizontal leg, the upper leg defining said upper pivot axis and the lower leg defining said lower pivot axis.

6. A level adjusting device as defined in claim 5, wherein:
   the pivot connection locking means includes clamping means for securing the angular adjustment positions of the guide shoe carrier.

7. A level adjusting device as defined in claim 6, wherein:
   the upper pivot connection includes a support bracket mounted on the sliding roof panel and engaging the upper leg of the guide shoe carrier; and
   said clamping means includes a threaded portion on said upper leg adjacent said support bracket and at least one clamping nut engaging the latter.

8. A level adjusting device as defined in claim 7, wherein:
   said upper leg of the guide shoe carrier includes a collar portion of enlarged diameter; and
   said collar portion and the support bracket of the upper pivot connection define axially cooperating clamping faces, as part of said clamping means.

9. A level adjusting device as defined in claim 8, wherein:
   said clamping faces of the collar portion and support bracket are part of two serrated discs which are attached to the guide shoe carrier leg and to the support bracket, respectively.

10. A level adjusting device as defined in claim 8, wherein:
    the upper leg of the guide shoe carrier is considerably longer than its lower leg, thereby extending inwardly from the lateral guide profile;
    and
    the support bracket and the enlarged collar portion of said upper leg are located inwardly of said guide profile so as not to interfere with the latter.

* * * * *